US 9,625,211 B2

(12) United States Patent
Palmer et al.

(10) Patent No.: US 9,625,211 B2
(45) Date of Patent: Apr. 18, 2017

(54) BEAD COLLECTION DEVICE AND METHOD

(75) Inventors: Daniel David Palmer, Cardiff (GB); Owen Lesley Shadick, Derby (GB); Stuart James Bartley, Bridgend (GB); Brynmor Alexander John, Cardiff (GB)

(73) Assignee: MIDATECH PHARMA (WALES) LIMITED, Cardiff (GB)

( * ) Notice: Subject to any disclaimer, the term of this patent is extended or adjusted under 35 U.S.C. 154(b) by 518 days.

(21) Appl. No.: 14/234,059

(22) PCT Filed: Jul. 27, 2012

(86) PCT No.: PCT/GB2012/051817
§ 371 (c)(1),
(2), (4) Date: Mar. 28, 2014

(87) PCT Pub. No.: WO2013/014466
PCT Pub. Date: Jan. 31, 2013

(65) Prior Publication Data
US 2014/0202026 A1    Jul. 24, 2014

(30) Foreign Application Priority Data

Jul. 28, 2011 (GB) .................................. 1113007.7

(51) Int. Cl.
*B01D 21/26* (2006.01)
*F26B 5/12* (2006.01)
(Continued)

(52) U.S. Cl.
CPC ............ *F26B 5/12* (2013.01); *B01D 21/2405* (2013.01); *B01D 21/2411* (2013.01);
(Continued)

(58) Field of Classification Search
None
See application file for complete search history.

(56) References Cited

U.S. PATENT DOCUMENTS

| 3,245,536 A | 4/1966 | McKay et al. |
| 4,116,824 A | 9/1978 | Somkaite et al. |
| (Continued) | | |

FOREIGN PATENT DOCUMENTS

| CN | 201244517 Y | 5/2009 |
| JP | 50-111771 | 2/1949 |
| (Continued) | | |

OTHER PUBLICATIONS

Brandenberger: "Development of a novel high-performance Cyclone to increase the Yield in a Mini Spray Dryer"; best@buchi, Evaporation 27/2003, http://www.mybuchi.com/uploads/media/BestBuchi27_EVA_14.pdf (4 pages).
(Continued)

*Primary Examiner* — Mary F Theisen
(74) *Attorney, Agent, or Firm* — Hamre, Schumann, Mueller & Larson, P.C.

(57) ABSTRACT

A device is provided for separating beads from a carrier fluid, the device comprising: a bead-receiving means for receiving beads dispersed in a carrier fluid, a fluid removal means operable to remove fluid from the bead-receiving means in a first fluid removal zone by the application of reduced pressure, and a bead collection means operable to remove beads from the bead-receiving means in a bead collection zone by the application of reduced pressure, the bead-receiving means being movable so that beads are movable from the first fluid removal zone to the bead collection zone.

17 Claims, 4 Drawing Sheets

(51) Int. Cl.
  *B01J 2/18* (2006.01)
  *B01J 19/00* (2006.01)
  *B01D 21/24* (2006.01)

(52) U.S. Cl.
  CPC .............. *B01D 21/267* (2013.01); *B01J 2/18* (2013.01); *B01J 19/0093* (2013.01)

(56) References Cited

U.S. PATENT DOCUMENTS

| | | | |
|---|---|---|---|
| 4,289,624 | A | 9/1981 | Golczewski et al. |
| 4,303,522 | A | 12/1981 | Ducasse |
| 4,906,369 | A | 3/1990 | Bähr |
| 5,167,770 | A | 12/1992 | Bubik et al. |
| 5,617,649 | A | 4/1997 | Joo |
| 6,258,282 | B1 | 7/2001 | Strid et al. |
| 6,998,074 | B1 | 2/2006 | Radulescu |
| 7,455,797 | B2 | 11/2008 | Shekunov et al. |
| 2006/0108012 | A1 | 5/2006 | Barrow et al. |
| 2009/0035579 | A1* | 2/2009 | Coufal ................... B01D 53/90 428/403 |
| 2009/0194467 | A1 | 8/2009 | Garrett et al. |
| 2010/0319923 | A1 | 12/2010 | Slabaugh et al. |
| 2011/0160134 | A1* | 6/2011 | Palmer ................ A61K 9/1647 514/9.7 |
| 2012/0126439 | A1* | 5/2012 | Lang ................... C01B 17/0216 264/6 |
| 2013/0259961 | A1* | 10/2013 | Palmer ...................... B01J 2/08 425/10 |

FOREIGN PATENT DOCUMENTS

| | | |
|---|---|---|
| JP | 55-149800 | 11/1980 |
| JP | 01-151961 | 6/1989 |
| JP | 03-106410 | 7/1991 |
| JP | H05-239121 | 9/1993 |
| JP | 2004-330037 | 11/2004 |
| WO | WO 92/18222 | 10/1992 |
| WO | WO 2004/043598 | 5/2004 |
| WO | WO 2005/123241 | 12/2005 |
| WO | WO 2006/082351 | 8/2006 |
| WO | WO 2007/072002 | 6/2007 |
| WO | WO 2008/040959 | 4/2008 |
| WO | WO 2010/004253 | 1/2010 |

OTHER PUBLICATIONS

Extract from GB Patent Application No. 1113007.7 "Bead collection device and method" (1 page).

Japanese Office Action issued in corresponding Japanese Application No. 2014-524438 dated Jul. 8, 2016 (4 pages).

* cited by examiner

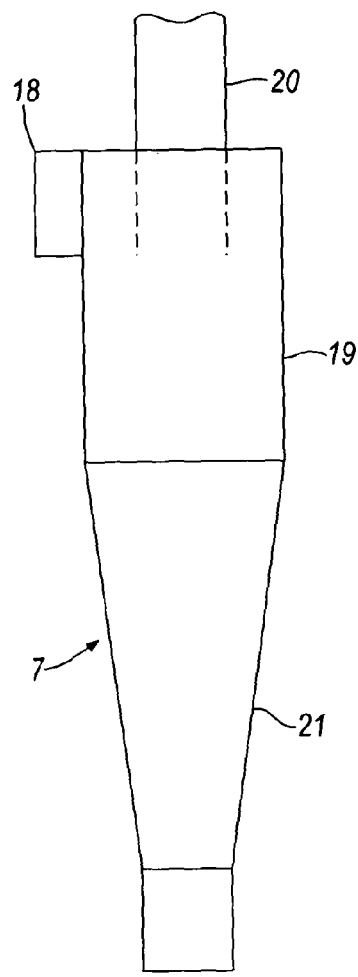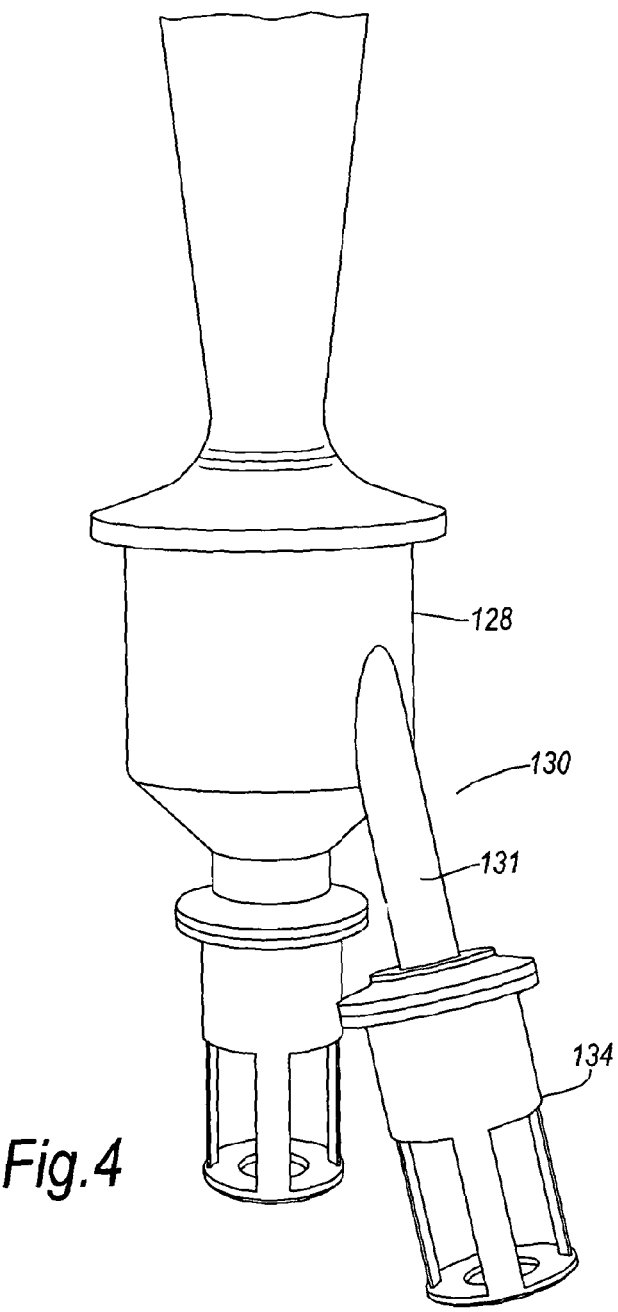
Fig.3
Fig.4

BEAD COLLECTION DEVICE AND METHOD

The present invention relates to a device and method for the collection of beads, in particular (but not exclusively) beads having a greatest dimension of from 1 µm to 5000 µm, which may be generated using microfluidic technology.

It is well-known to use microfluidic technology to make small beads. Such beads may be of any shape, but are typically spherical. The mean greatest dimension of such beads may vary according to the proposed use of the beads, but is typically from 1 µm to 5000 µm. The beads are typically solid (for example, in the form of a gel) and are usually generated dispersed in a carrier fluid which is usually a liquid (which may, for example, be a solution, such as an aqueous solution). Separation of the beads from the carrier fluid has typically been achieved by filtration. Filtration is performed in a batch-wise manner and is therefore not very efficient and cannot be automated easily. After the beads are separated from the carrier liquid by filtration they are typically dried in an oven or a flow of a drying gas. The process of filtration and oven-drying cannot be automated easily, and does not lend itself to producing large amounts of beads.

The device and method of the present invention seek to address or at least ameliorate one or more of the problems mentioned above.

There is provided in accordance with a first aspect of the present invention, a device for separating beads from a carrier fluid, the device comprising:
a bead-receiving means for receiving beads dispersed in a carrier fluid,
a fluid removal means operable to remove fluid from the bead-receiving means in a first fluid removal zone by the application of reduced pressure, and
a bead collection means operable to remove beads from the bead-receiving means in a bead collection zone by the application of reduced pressure,
the bead-receiving means being movable so that beads are movable from the first fluid removal zone to the bead collection zone.

The device of the present invention facilitates a semi-continuous process, as opposed to a batch process. This is achieved by providing a bead-receiving means which moves beads from the first fluid removal zone in which fluid is removed from the beads to a bead collection zone in which beads are removed from the bead-receiving means. Beads and fluid are provided onto a portion of the bead-receiving means in a bead-receiving zone. The bead-receiving zone may be located upstream of the first fluid removal zone, in which case the bead-receiving means may be movable so that beads and fluid are moved from the bead-receiving zone to the first fluid removal zone. Alternatively, the bead-receiving zone may overlap with the first fluid removal zone.

The bead-receiving means may optionally be movable in a reciprocating motion, for example, so that a portion of bead-receiving means may be moved back and forth between the first fluid removal zone and the bead collection zone, especially if beads dispersed in carrier fluid are deposited onto the bead-receiving means in the first fluid removal zone.

The bead-receiving means may optionally be movable in one direction (as opposed to being movable in a reciprocating motion).

The bead-receiving means may optionally be rotatable and may, for example, be continuously rotatable. This facilitates the production of a simple, compact device which, for example, may use a turntable to move the bead-receiving means. The bead receiving means may optionally be continuously-rotatable in one direction, for example. Where the bead-receiving means is rotatable, the beads typically move in an arc from the first fluid removal zone to the bead collection zone. The bead-receiving means may typically be annular or disk-shaped. The bead-receiving means may optionally be substantially flat.

The device may optionally comprise a holder for the bead-receiving means. The holder may optionally be rotatable, rotation of the holder causing rotation of the bead-receiving means. The holder for the bead-receiving means may optionally comprise a wall. The wall may typically surround the bead-receiving means. The wall may optionally extend upwardly.

The bead-receiving means may optionally be in form of a strip, for example, a closed strip e.g. in the form of a belt. Rollers may typically be used to move a belt.

The device may optionally comprise a chamber for the collection of fluid. The chamber may optionally be provided with a chamber outlet for egress of collected fluid.

The bead-receiving means may optionally be fluid-permeable, typically liquid-permeable. For example, the bead-receiving means may optionally comprise a sheet. The bead-receiving means may optionally be in the form of a mesh. Alternatively, the bead-receiving means may optionally comprise a sponge.

The fluid removal means may optionally be operable to remove fluid through the fluid-permeable bead-receiving means. In this way, fluid may optionally be removed through the fluid-permeable bead-receiving means (which may be a mesh, for example), to leave the beads resting on a surface (typically an upper surface) of the bead-receiving means. This may be achieved, for example, by providing a bead-receiving means having a first surface for the receipt of beads and fluid (typically an upper surface) and a second surface, opposite the bead-receiving surface. In this case, the first fluid removal means may optionally be operable to remove fluid through the fluid-permeable bead-receiving means and out of the second surface. This may be achieved by providing the first fluid removal means with a fluid-removing inlet operably close to the fluid-permeable bead-receiving means.

The device may optionally be provided with a second fluid removal zone in which a fluid removal means is operable to remove fluid from the bead-receiving means. The presence of a second fluid removal zone may be of particular benefit if the bead receiving means is moving quickly. The fluid removal means associated with the second fluid removal zone may optionally be the same fluid removal means which is operable to removal fluid from the first fluid removal zone. Alternatively, a further fluid removal means may optionally be provided to remove fluid in the second fluid removal zone. Said fluid removal means may optionally be operable to remove fluid from the bead-receiving means in the second fluid removal zone by the application of reduced pressure.

For example, said fluid removal means may optionally be operable to remove fluid through the fluid-permeable bead-receiving means (if present) in the second fluid removal zone. In this way, fluid may be removed through the fluid-permeable bead-receiving means (which may be a mesh, for example), to leave the beads resting on a surface (typically an upper surface) of the bead-receiving means. This may be achieved, for example, by providing a bead-receiving means having a first surface for the receipt of beads and fluid (typically an upper surface) and a second surface, opposite the bead-receiving surface. In this case, said fluid removal means may be operable to remove fluid through the fluid-permeable bead-receiving means and out of the second surface in the second fluid removal zone. This may optionally be achieved by providing the second fluid removal means with a fluid-removing inlet operably close to the fluid-permeable bead-receiving means.

The second fluid removal zone may optionally be located in a path between the first fluid removal zone and the bead collection means.

The bead collection means may optionally comprise one or more cyclone generators (and preferably only one cyclone generator). Cyclone generators have proven to be very effective at removing beads from the bead-receiving means. Further potential benefits of cyclone generators include removal of fluid which remains with the beads, if any remains after the beads have been subject to the fluid removal means. Cyclone generators may also remove some beads or particulate contaminants which are undesirably small.

If the bead collection means comprises one or more cyclone generators, the bead collection means may optionally comprise one or more cyclone suppressors. Such suppressors help in dis-entraining beads from a cyclone and facilitate collection of the beads. The one or more cyclone suppressors may optionally be located downstream of the one or more cyclone generators. The one or more cyclone suppressors is typically located below the one or more cyclone generator. The cyclone suppressor optionally comprises an expanded portion.

The cyclone generator or cyclone suppressor may be provided with a sampling aperture. The sampling aperture is typically provided in a wall of the cyclone generator or the cyclone suppressor. The sampling aperture enables a portion of the collected beads entrained by the cyclone to be collected for analysis, whilst not stopping the bead collection process. The sampling aperture is typically provided in a side wall of the cyclone generator or cyclone suppressor, and is in addition to a cyclone bead outlet through which a majority of the beads pass. A sampling guide may be provided for directing beads to the sampling aperture. The sampling guide may comprise one or more projections for directing beads to the sampling aperture. A sampling conduit may be provided for supplying beads to a sampling receptacle. The sampling conduit may extend through or from the sampling aperture. The sampling conduit may provide a sampling guide for directing beads down the sampling conduit.

The first fluid removal means, the second fluid removal means (if present) and the bead collection means may optionally comprise a vacuum pump, a suction pump or a side-channel blower. One or more of the first fluid removal means, the second fluid removal means (if present) and the bead collection means may optionally be operable to vary the reduced pressure of operation. It may be desirable for the reduced pressures applied by the first fluid removal means not to be too low, because very low pressures may cause beads to stick to the bead receiving means and/or may cause the beads to deform.

The device may optionally comprise a cover for covering the bead-receiving means. The cover may optionally comprise one or more windows. The cover may optionally comprise an upper part and a skirt depending from the upper part. The device of the present invention may be used in a laminar flow cabinet in an aseptic environment, and a cover may inhibit disturbance of beads which are on the surface of the bead-receiving means.

The device may optionally comprise an inlet for the passage therethrough of beads dispersed in carrier fluid. If the device is provided with a cover, the cover may optionally be provided with an aperture which may act as the inlet. The aperture may optionally accept a conduit from a bead-generating device, the bead-generating device being operable to generate beads dispersed in carrier fluid. If the cover comprises an upper part and a skirt depending from the upper part, said aperture may typically be provided in the upper part of the cover.

The device may optionally be provided with an outlet for the egress of beads. If the device comprises a cyclone suppressor, the cyclone suppressor may optionally be provided with the device outlet.

The device may optionally comprise a floor portion beneath the bead-receiving means. The floor portion may inhibit the passage of gas flow to the bead-receiving means from beneath the bead-receiving means. Such gas flows may typically occur in a laminar flow cabinet.

The device of the present invention may typically be used to separate beads from a carrier fluid. The carrier fluid is typically a liquid, such as a non-volatile liquid, typically water. The beads are typically solid beads, and may be neutrally charged, negatively charged or positively charged. The beads may be of any shape, but are typically substantially spherical. The beads typically have a mean greatest dimension of from 1 micron to 2000 microns, but more typically have a greatest dimension of from 5 microns to 500 microns, and optionally have a greatest dimension of from 20 microns to 300 microns.

There is provided in accordance with a second aspect of the present invention, a device for separating beads from a carrier fluid, the device comprising:

a substantially-flat bead-receiving means for receiving beads dispersed in a carrier fluid, a fluid removal means operable to remove fluid from the bead-receiving means in a first fluid removal zone, and a bead collection means operable to remove beads from the bead-receiving means in a bead collection zone, the bead-receiving means being rotatable so that beads are movable from the first fluid removal zone to the bead collection zone.

In moving from the first fluid removal zone to the bead collection zone, the beads typically move in an arc. This provides a potentially compact device which, for example, may use a turntable to support and move the bead-receiving means.

The first fluid removal means may optionally be operable to remove fluid by the application of a reduced pressure.

The bead collection means may optionally be operable to remove beads by the application of a reduced pressure.

The device of the second aspect of the present invention may comprise those features described above with reference to the device of the first aspect of the present invention. For example, the bead collection means may optionally comprise a cyclone generator.

The device of the first and second aspects of the present invention is typically suitable for use in aseptic conditions. The device of the first and second aspects of the present invention is therefore typically made from materials which are suitable for use in aseptic environments, such as pharmaceutical-grade stainless steel. Therefore, the device of the first and second aspects of the present invention is typically suitable for use in laminar flow conditions, typically vertical laminar flow conditions. The device of the first and second aspect of the present invention is typically suitable for autoclaving i.e. the device can withstand autoclaving. Autoclaving is used to sterilise items, and typically involves exposure to saturated steam at about 121° C., typically for 15-20 minutes.

In accordance with a third aspect of the present invention, there is provided an apparatus for the generation and collection of beads, said apparatus comprising:
(a) A bead generator for generating beads dispersed in a carrier fluid;
(b) A separating device in accordance with the first or second aspect of the present invention arranged to receive beads dispersed in a carrier fluid from the bead generator.

The bead generator may optionally comprise a microfluidic device as described in WO2004/043598, or in WO2010/004253. The bead generator may optionally comprise a piezoelectric droplet generator. A piezoelectric droplet generator may optionally be used to generate a stream of liquid droplets which may be hardened to form solid beads.

In accordance with a fourth aspect of the present invention, there is provided a method for separating beads from a carrier fluid, the method comprising:
(i) Providing beads dispersed in a carrier fluid onto a bead-receiving means;
(ii) Removing at least part of said carrier fluid using reduced pressure;
(iii) Moving the bead-receiving means; and
(iv) Collecting said beads from the bead-receiving means using reduced pressure.

The method may typically comprise a second step of removing part of said carrier fluid, optionally using reduced pressure. This second step of removing part of said carrier fluid preferably takes place prior to collecting said beads from the bead-receiving means.

Those skilled in the art will realise that the method of the fourth aspect of the present invention may use one or more of the features of the device described above in relation to the device of the first aspect of the present invention. For example, the bead-receiving means may be liquid-permeable, and the bead-receiving means may be rotatable, optionally at a rate of from 0.1 to 10 rpm, optionally from 0.2 to 5 rpm an optionally from 0.2 to 1 rpm.

Therefore, the method may optionally comprise providing a bead-receiving means which is fluid-permeable, and step (ii) may optionally comprise removing carrier fluid through the fluid-permeable bead-receiving means.

The method of the fourth aspect of the present invention may be performed using the device of the first aspect of the present invention or the apparatus of the third aspect of the present invention.

In accordance with a fifth aspect of the present invention, there is provided a method for separating beads from a carrier fluid, the method comprising:
(i) Providing beads dispersed in a carrier fluid onto a substantially flat bead-receiving means;
(ii) Removing at least part of said carrier fluid;
(iii) Rotating the bead-receiving means; and
(iv) Collecting said beads from the bead-receiving means.

The method may typically comprise a second step of removing part of said carrier fluid, optionally using reduced pressure. This second step of removing part of said carrier fluid preferably takes place prior to collecting said beads from the bead-receiving means.

Step (ii) may optionally be affected using reduced pressure. Likewise, step (iv) may optionally be achieved using reduced pressure.

Those skilled in the art will realise that the method of the fifth aspect of the present invention may use one or more of the features of the device described above in relation to the device of the first and/or second aspect of the present invention. For example, the bead-receiving means may be liquid-permeable.

Therefore, the method may optionally comprise providing a bead-receiving means which is fluid-permeable, and step (ii) may optionally comprise removing carrier fluid through the fluid-permeable bead-receiving means.

The method of the fifth aspect of the present invention may be performed using the device of the second aspect of the present invention or the apparatus of the third aspect of the present invention.

The method of the fifth aspect of the present invention may comprise those features described above in relation to the method of the fourth aspect of the present invention.

The methods of the fourth and fifth aspects of the present invention may be performed in an aseptic environment.

Those skilled in the art will realise that the devices and methods of the present invention may be used to separate solids other than beads from a fluid flow.

The invention will now be described by way of example only with reference to the following figures of which:

FIG. 3 is a side-on view of the cyclone generator used in the device of FIGS. 1 and 2;

FIG. 4 is a stylised perspective view of an alternative example of a cyclone generator and cyclone suppressor comprising a bead sampling arrangement.

Figure 1:
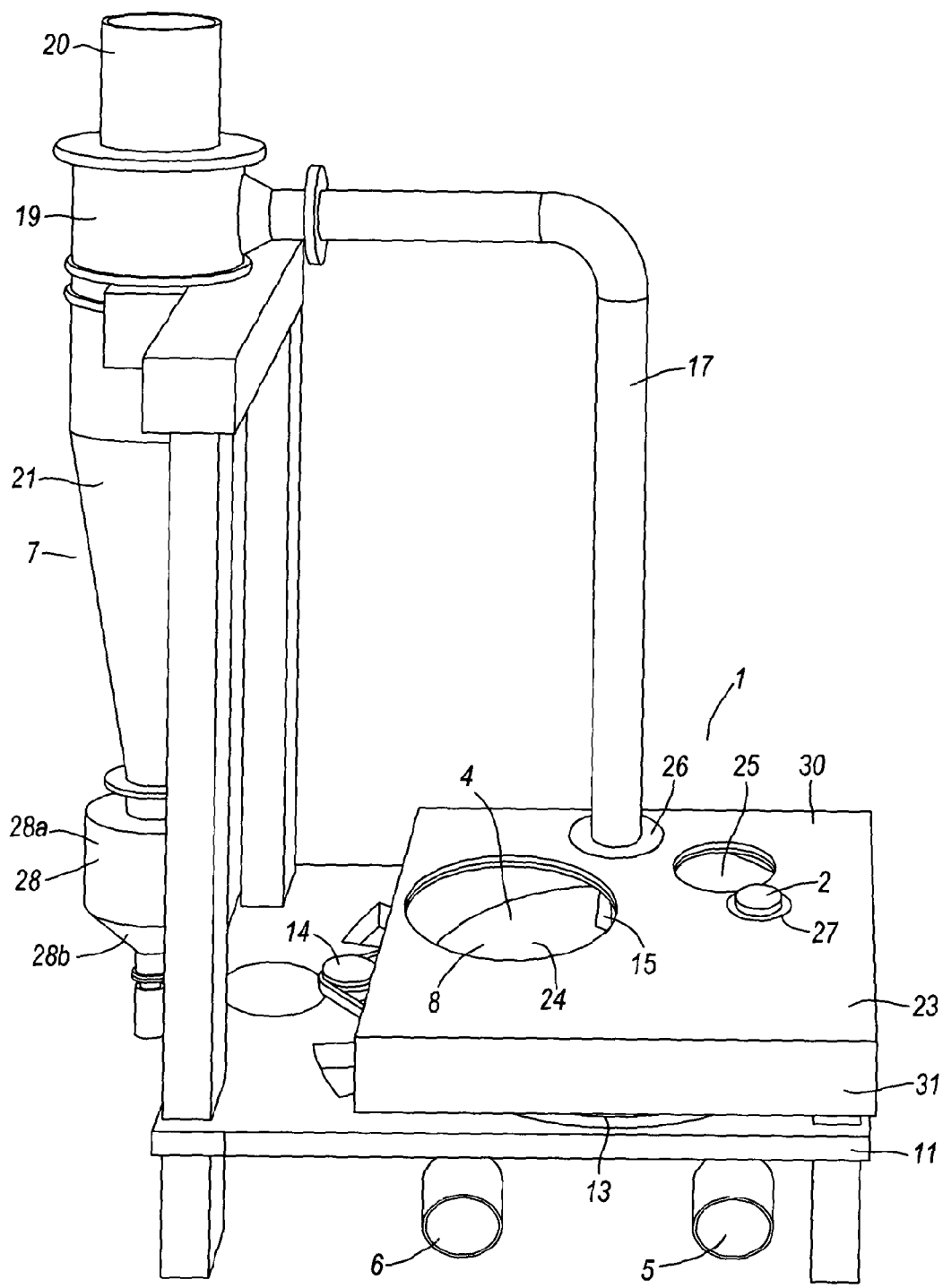
FIG. 1 shows a perspective view of an example of an embodiment of a device in accordance with the present invention.

An example of a device in accordance with the first aspect of the present invention is shown in FIG. 1, and is denoted generally by reference numeral 1. The device 1 comprises an inlet 2 for the receipt of beads and liquid from a bead generating device (not shown). The inlet is provided by a bead-delivering nozzle 3 which is connectable to the outlet of a bead generating device. The nozzle 3 is arranged to deposit beads in a carrier fluid onto the top surface of a rotatable sieve 4. A first liquid removing nozzle 5 (best seen in FIG. 2) is located opposite bead-delivering nozzle 3. The liquid removing nozzle 3 is attached to a vacuum pump (not shown) so that liquid is drawn through the sieve 4 and into the first liquid removing nozzle 5. The device 1 is provided with a second liquid removing nozzle 6 for removing liquid through the sieve. The second liquid removing nozzle 6 is attached to the same vacuum pump to which the first liquid removing nozzle 5 is attached. The device 1 comprises a cyclone generator 7 for collecting beads from the upper surface of the sieve 4. The cyclone generator 7 is attached to a vacuum pump (not shown) to generate the cyclone in the cyclone generator 7. The cyclone generator 7 is attached to a cyclone suppressor 28 which helps suppress the cyclonic movement of air which is generated by the cyclone generator 5. The device 1 and its operation will now be described in more detail.

Figure 2:
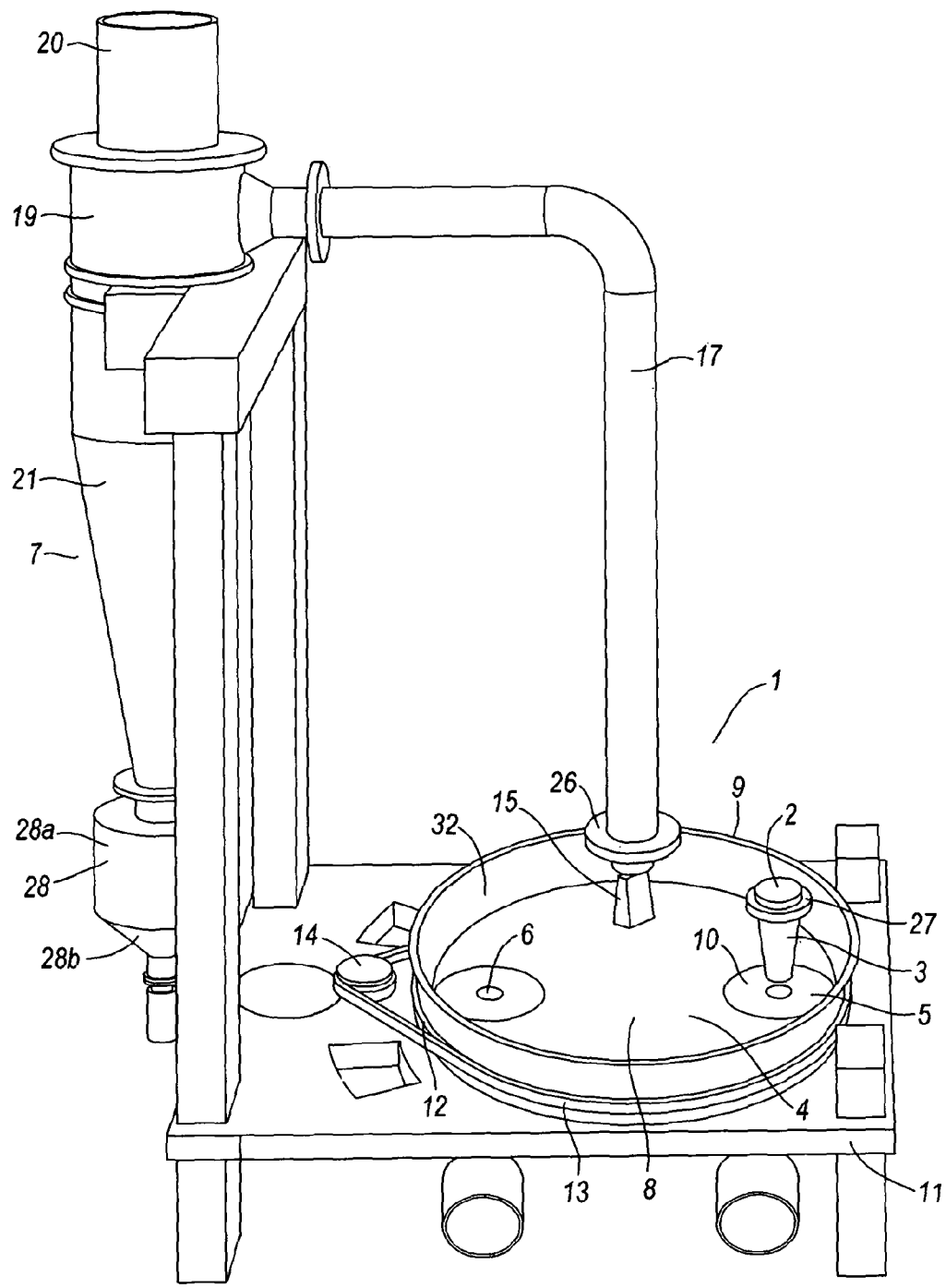
FIG. 2 shows a perspective view of the device of FIG. 1, but with a cover removed to show certain parts of the device more clearly.

Beads in a carrier fluid (typically a carrier liquid) are provided from a bead generating device (not shown) to inlet 2. The beads are typically solid and may have a mean greatest dimension of from about 1 micron to about 500 microns, more typically of from about 10 microns to about 200 microns. A conduit (not shown) connects the bead generating device to the bead-delivering nozzle 3. As can be seen in FIG. 2, the bead-delivering nozzle 3 is of a generally frusto-conical shape; the bead-delivering nozzle 3 is made from an SLA (stereolithography) resin. The tip of bead-delivering nozzle 3 is located several mm above the upper surface of sieve 4. Sieve 4 is a stainless steel test sieve (VWR International Limited) which comprises a stainless steel mesh 8 of 200 mm diameter and having a pore size of 32 microns. The mesh 8 is supported by a substantially cylindrical support 9.

A first liquid removing nozzle 5 is located opposite the bead-delivering nozzle 3 and on the other side of the sieve 4 (as can best be seen in FIG. 2), forming a first liquid-removal zone A. The first liquid removing nozzle 5 is made from SLA resin and has a generally trumpet shape, having a smallest diameter at the end nearer to the sieve 4. The internal diameter of the first liquid removing nozzle 5 at the end nearer the sieve 4 is about 10 mm, whereas the internal diameter of the nozzle at the end remote from the sieve is about 32 mm. The first liquid removing nozzle 5 is provided with an annular flange 10 which rests on a base 11. The base 11 is formed from PTFE (polytetrafluoroethylene) and is provided with an aperture (not shown) for the receipt of the first liquid removing nozzle 5. The base 11 helps hold the first liquid removing nozzle 5 in spaced relationship to the sieve 4. Base 11 also provides a barrier to upwards airflow which would disturb beads present on the surface of sieve 4. The gap between the end of the first liquid removing nozzle 5 and mesh 8 is about 2-4 mm. The first liquid removing nozzle 5 is attached to a 1750 W side-channel blower (not shown, AirTec Air Systems Limited, Mossley, Lancs., UK) which was used to generate low pressure. As an alternative, a 1500 W domestic vacuum cleaner pump has been used instead of the side-channel blower. The side-channel blower produces a region of reduced pressure close to the end of the first liquid removing nozzle 5. Liquid associated with the beads is drawn through the sieve 4 and into the first liquid removing nozzle 5, leaving beads on the upper surface of the sieve 4.

As indicated, the sieve 4 is rotatable and those features associated with rotation of the sieve 4 will now be described. A groove 12 is provided in the support 9 in which a drive belt 13 is located. The drive belt 13 is engaged with pulley 14 which is driven by a motor (not shown). The motor is a 12V DC brushless motor (Cramer Co., Digi-key motor), rotating at 30 rpm. The motor operates at 30 rpm, and is arranged to turn the sieve at about 5 rpm. The motor may be provided with alternative gearing so that the sieve is turned at slower speeds, such as 0.5 rpm. Rotation of the sieve 4 and the relationship between the sieve 4 and the removal of the beads from the sieve 4 will now be described.

The portion of the sieve 4 previously in the first liquid-removal zone is moved by rotation of the sieve 4 to a second liquid removal zone B which is provided by a second liquid removing nozzle 6. The second liquid removing nozzle 6 is essentially the same shape and size as the first liquid removing nozzle 5 and, like the first liquid removing nozzle 5, the smaller end of the second liquid removing nozzle 6 is spaced some 2-4 mm from the underside of the mesh 8. The second liquid removing nozzle 6 is attached to a second 1750 W side-channel blower which operates in essentially the same way as the first liquid removing nozzle 5. Liquid entering the first 5 and second 6 liquid removing nozzles is collected in a receptacle (not shown) for subsequent reuse or disposal.

The portion of sieve 4 previously in the second liquid-removal zone is moved by rotation of the sieve to the bead collection zone C. The bead collection zone C is provided by a bead-collecting nozzle 15, the end of which is spaced some 0.5 to 1 mm from the upper surface of mesh 8. The nozzle 15 has a tapered shape, with a narrower cross-section nearer to the mesh 8. The aperture (not shown) provided in the bead collecting nozzle 15 is substantially rectangular in shape, and has a length of about 26 mm and a width of about 10 mm. The bead collecting nozzle 15 is made from SLA resin. The bead collecting nozzle 15 is attached to a cyclone generator 7 via conduit 17. The cyclone generator 7 is made from SLA resin and is attached to a 1750 W side-channel blower (not shown). Alternatively, a 1500 W domestic vacuum cleaner pump has been used instead of a side-channel blower. Beads present on the surface of the sieve 4 are removed by the low pressure exerted by the cyclone generator 7, and the beads undergo cyclonic movement in the cyclone generator 7. The cyclone generator 7 comprises a cyclone generator inlet 18 for attachment to conduit 17, the cyclone generator inlet 18 being located towards the top of a cylindrical portion 19. The cyclone generator inlet 18 is approximately 3.75 cm high. The cylindrical portion 19 has a diameter of 7.5 cm and a length/height of 11.25 cm. A connector 20 for connecting a vacuum pump (not shown) to the cyclone generator 7 is provided above the cylindrical portion 19. The connector 20 is substantially cylindrical and has an internal diameter of 3.75 cm. The connector 20 also extends some 3.75 cm into the space defined by cylindrical portion 19 as shown by the dotted lines in FIG. 3. A frusto-conical, tapering portion 21 is provided below the cylindrical portion 19. The frusto-conical, tapering portion 21 has a height/length of 18.75 cm, and a diameter at the bottom of 2.8 cm. A cyclone suppressor 28 is provided below the tapering portion 21. The cyclone suppressor 28 has an upper cylindrical portion 28a and a lower portion 28b which is provided with an outlet (not shown) for delivering beads to a receptacle (not shown) for collection. The upper cylindrical portion 28a has a greater cross-sectional area than the bottom of the frusto-conical, tapering portion 21 of the cyclone generator 7. Whilst not wishing to be bound by theory, it is believed that very small beads are removed via connector 20 and that residual liquid is either evaporated or aerosolised.

A volume-filling block (not shown) may be provided below mesh 8 opposite nozzle 15. This improves the efficiency of the removal of the beads by reducing the volume of free space below the mesh opposite the nozzle. The device 1 is provided with a cover 23 which inhibits contamination of the surface of the sieve 4. The cover 23 is provided with two windows 24, 25 through which the sieve 4 may be observed. The cover 23 has a square upper portion 30 and a downwardly-projecting skirt portion 31. The cover 23 inhibits downward airflow (such as would be present in a vertical airflow laminar flow cabinet) from disturbing any beads present on the surface of the sieve 4. Downwardly-projecting skirt portion 31 overlaps with upwardly-projecting wall 32 which forms part of the support 9 for the sieve 4. The wall 32 and skirt portion 31 inhibit sideways airflows form disturbing any beads present on the surface of the sieve 4.

Attachment means 26 is provided in the cover 23 for attaching the conduit 17 and bead connecting nozzle 15. Likewise, attachment means 27 is provided in the cover 23 for attaching the bead delivering nozzle 3 and a conduit (not shown) of a bead-generating device (not shown).

The device of the present invention makes beads that flow without any visible sign of coagulation. Coagulation of the beads would be indicative of the presence of an unacceptable amount of moisture.

Beads of PLGA (poly(lactic-co-glycolic acid)) were manufactured as described below. Droplets of a PLGA polymer in dimethyl sulfoxide (DMSO) were discharged using a piezoelectric head into a carrier fluid comprising 85 wt % water and 15 wt % tertiary butanol. It is believed that the carrier fluid acts as an anti-solvent, the DMSO being drawn from the droplets so as to form solid beads. The carrier fluid carrying the solid beads was introduced from the bead making device (not shown), through bead delivering nozzle 3 and onto the sieve 4. The rate of flow of the carrier fluid onto the surface of the sieve 4 was approximately 70 liter/hour. The concentration of beads in the carrier fluid was about 1 g of beads in 20 liters of carrier fluid. The sieve 4 was rotating at about 5 revolutions per minute. Carrier fluid was removed via the first liquid removing nozzle 5, and collected in a container (not shown) for re-use. Beads were removed from the surface of the sieve 4 via bead collection nozzle 15 and into the cyclone generator 7. Beads were collected beneath the cyclone suppressor 28.

One or more parts of the apparatus of FIGS. 1-3 may be connected for use in sterile, aseptic environments. For example, the cyclone generator 7 and cyclone suppressor 28 may be connected using ferrule-type fittings and may be held together using clamps, as is well known to those skilled in the art of aseptic joins and fittings.

Figure 5:
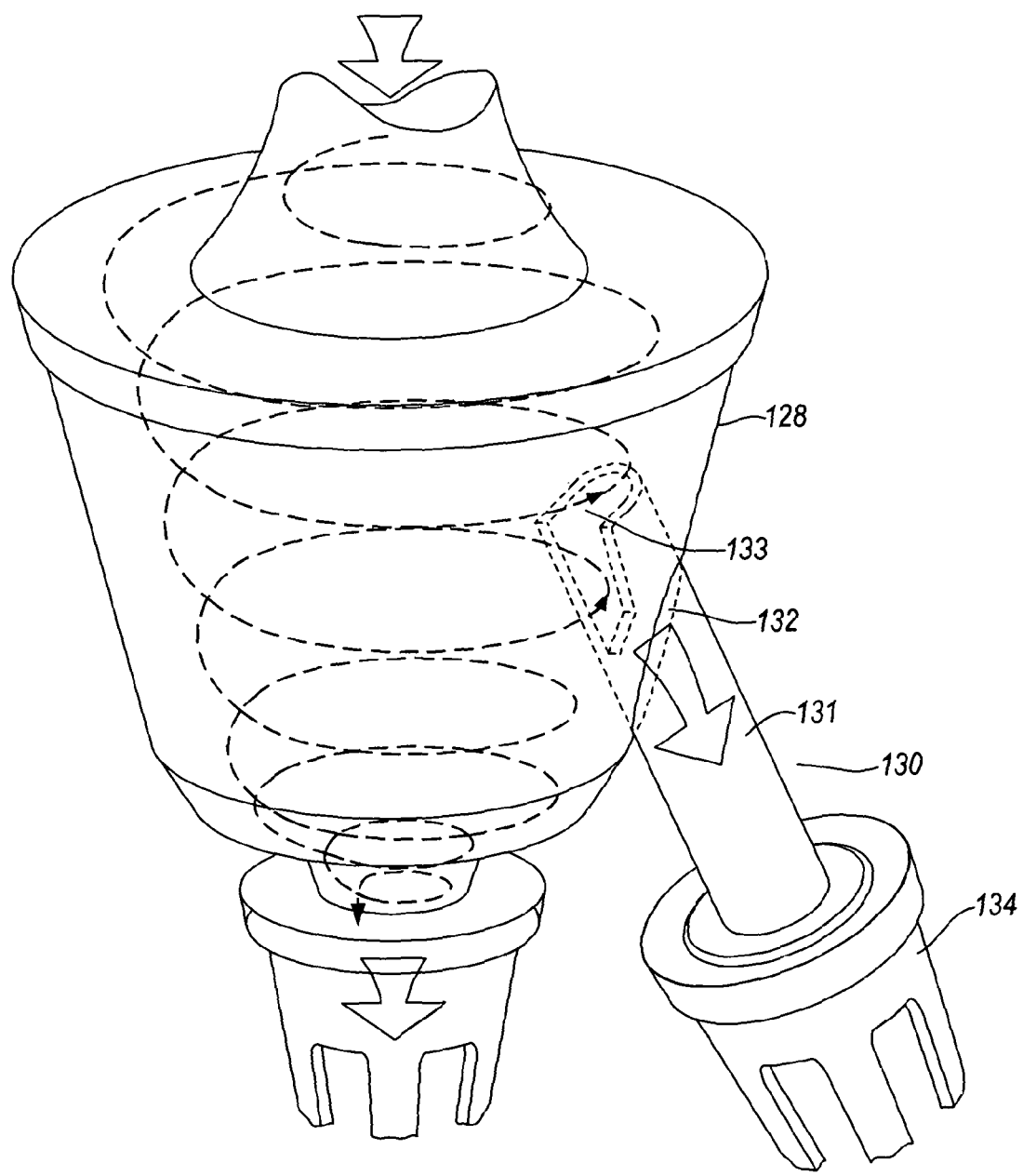
FIG. 5 is a stylised cut-away perspective view of the cyclone suppressor of FIG. 4.

An alternative example of a cyclone generator and cyclone suppressor for use in a device and apparatus in accordance with the present invention is shown in FIGS. 4 and 5. The cyclone suppressor 128 is similar to cyclone suppressor 28 described above in relation to FIGS. 1-3. However, cyclone suppressor 128 is provided with a bead sampling arrangement 130 comprising bead sampling conduit 131 which extends through bead sampling aperture 132. Referring to FIG. 5, the end of bead sampling conduit 131 is shaped to form a sampling guide 133 to direct beads down the bead sampling conduit 131. In operation, a proportion of beads caught in the vortex/cyclone impinge on the open face of sampling guide 133 and fall down the sampling conduit 131 into a sampling receptacle 134. The sampling arrangement 130 allows beads to be collected for analysis without stopping the bead production process. The proportion of beads collected by the bead sampling arrangement 130 depends on the cross-sectional size of the bead sampling conduit 131 and the geometry and size of the bead sampling guide 133.

The beads so made are substantially spherical, free flowing and show no coagulation (indicating that the beads are sufficiently dry). The bead size has a low standard variation.

The method described above has been used to collect beads having a mean diameter of from 25 to 60 microns.

Those skilled in the art will realise that many other methods may be used to make beads. For example, the bead generating methods and devices described in WO2010/004253 are suitable for use with the separating device of the present invention.

Those skilled in the art will also realise that the device of the present invention may be used to separate beads which are different from those described above and those made in WO2010/004253. For example, the device of the present invention may be used to separate beads made using one of the many bead generating devices and methods which are known to those skilled in the art. Examples of such bead generating devices and methods are disclosed in WO2008/040959, WO2007/072002, WO2006/082351 and WO2005/123241.

The cyclone generator described above has been designed to collect beads having a diameter of about 20-100 microns.

Those skilled in the art will realise that the properties of the cyclone collector may be selected to optimise the collection of beads having different diameters.

The examples above disclose the use of a rotatable bead-receiving means. Those skilled in the art will realise the other arrangements of bead-receiving means may be used. For example, the bead-receiving means may be arranged as a belt, movable by rollers, for example. In such an arrangement, the first and second fluid removal means and the bead collection means may be arranged in a straight line, as opposed to being arranged on a circular path, as in FIGS. 1 and 2.

Both of the examples above disclose the use of a cyclone to remove beads from the bead-receiving means. Those skilled in the art will realise that other reduced pressure arrangements are possible, for example, and by collecting beads in a gas-permeable bag.

Both of the examples above disclose a bead-receiving means which moves in only one direction. Those skilled in the art will realise that the bead-receiving means may be arranged to move in two directions. In this case, the bead-receiving means may be arranged to reciprocate so that beads dispersed in carrier fluid move in a first direction through the fluid removal zone to the bead collection zone, and then the bead-receiving means moves in a second direction opposite to the first direction so that the portion of bead-receiving means now depleted of beads is ready for the receipt of more beads dispersed in carrier fluid.

Both of the examples above show the presence of a second fluid removal means. This is not essential to the operation of the device of the present invention, but is merely a preferred embodiment.

Both of the examples above describe the first fluid removal means as being arranged to remove fluid through the bead-receiving means. Those skilled in the art will realise that this is not essential to the operation of the device of the present invention, but is merely one possible arrangement.

Many of the components mentioned above are described as being made from an SLA resin. SLA resins are used to manufacture items using stereolithography, and are typically used because functional components may be made quickly and cheaply from SLA resins. Alternative materials may be used to replace SLA resins, such as pharmaceutical grade stainless steel.

The device of the present invention may typically be used in an aseptic environment.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An apparatus for generation and collection of beads, comprising:
   (a) a bead generator for generating beads dispersed in a carrier fluid, the bead generator comprising a microfluidic device or a piezoelectric droplet generator for generating substantially spherical beads; and
   (b) a device for separating said beads from said carrier fluid, the device comprising:

a bead-receiver arranged to receive said beads dispersed in said carrier fluid from said bead generator, a fluid remover operable to remove fluid from the bead-receiver in a first fluid removal zone by the application of reduced pressure, and a bead collector operable to remove beads from the bead-receiver in a bead collection zone by the application of reduced pressure, the bead-receiver being movable so that beads are movable from the first fluid removal zone to the bead collection zone.

2. An apparatus according to claim 1, wherein beads and fluid are provided onto a portion of the bead-receiving means in a bead-receiving zone.

3. An apparatus according to claim 2, wherein the bead-receiver is movable so that beads and fluid are movable from the bead-receiving zone to the first fluid removal zone.

4. An apparatus according to claim 1, wherein the bead-receiver is rotatable.

5. An apparatus according to claim 4, wherein the bead-receiver is annular or disk-shaped.

6. An apparatus according to claim 1, wherein the bead-receiving means comprises a mesh.

7. An apparatus according to claim 1, wherein the bead-receiver is liquid-permeable and the fluid remover is operable to remove fluid through the liquid-permeable bead-receiver.

8. An apparatus according to claim 1, wherein the bead collector comprises one or more cyclone generators.

9. An apparatus according to claim 8, wherein the bead collector comprises one or more cyclone suppressors.

10. An apparatus according to claim 9, wherein a cyclone suppressor comprises an outlet for the collection of beads and further comprises a sampling aperture and a sampling guide for directing beads to the sampling aperture.

11. An apparatus according to claim 8, wherein a cyclone generator comprises an outlet for the collection of beads and further comprises a sampling aperture and a sampling guide for directing beads to the sampling aperture.

12. An apparatus according to claim 1, further comprising a second fluid removal zone separate from the first fluid removal zone in which a fluid remover is operable to remove fluid from the bead-receiver.

13. The apparatus of claim 1, wherein the bead collector comprises a cyclone generator and a cyclone suppressor located below the cyclone generator, the cyclone suppressor comprising an expanded portion which has a greater cross-sectional area than the cyclone generator immediately above the expanded portion.

14. The apparatus of claim 1, wherein the bead collector comprises a cyclone generator and a cyclone suppressor located below the cyclone generator, the cyclone generator comprising a tapering, frusto-conical portion located above a cylindrical portion of the cyclone suppressor, the cross-sectional area of the cylindrical portion of the cyclone suppressor being greater than the cross-sectional area of the frusto-conical portion of the cyclone generator immediately above the cyclone suppressor.

15. A method for making beads in an aseptic environment, the method comprising, in an aseptic environment:
(i) using a piezoelectric droplet generator or a microfluidic device to generate substantially spherical beads having a mean diameter of from 20 microns to 300 microns dispersed in a carrier liquid;
(ii) providing said beads dispersed in said carrier liquid onto a bead-receiver;
(iii) removing at least part of said carrier liquid using reduced pressure;
(iv) moving the bead-receiver; and
(v) collecting said beads from the bead-receiver using a bead collector comprising a cyclone generator and a cyclone suppressor.

16. An apparatus for generation and collection of beads in an aseptic environment, comprising:
(a) a piezoelectric droplet generator or a microfluidic device for generating substantially spherical beads having a mean diameter of from 20 microns to 300 microns dispersed in a carrier liquid; and
(b) a device for separating said beads from said carrier liquid, the device comprising:
a bead-receiver comprising a liquid-permeable mesh arranged to receive said beads dispersed in said carrier liquid from the bead generator,
a fluid remover comprising a vacuum pump and a nozzle operable to remove fluid from the bead-receiver in a first fluid removal zone by the application of reduced pressure, and
a bead collector comprising a cyclone generator and a cyclone suppressor, the bead collector being operable to remove beads from the bead-receiver in a bead collection zone by the application of reduced pressure,
the bead-receiver being rotatable so that beads are movable from the first fluid removal zone to the bead collection zone;
the cyclone suppressor comprises an outlet for the collection of beads, and further comprises a sampling aperture that is different from the outlet for the collection of beads, and a sampling guide for directing beads to the sampling aperture.

17. An apparatus for the generation and collection of beads in an aseptic environment, said apparatus comprising:
(a) a piezoelectric droplet generator or a microfluidic device for generating substantially spherical beads having a mean diameter of from 20 microns to 300 microns dispersed in a carrier liquid; and
(b) a device for separating said beads from said carrier liquid, the device comprising:
a bead-receiver comprising a liquid-permeable mesh arranged to receive said beads dispersed in said carrier liquid from the bead generator,
a fluid remover comprising a vacuum pump and a nozzle operable to remove fluid from the bead-receiver in a first fluid removal zone by the application of reduced pressure, and
a bead collector comprising a cyclone generator and a cyclone suppressor, the bead collector being operable to remove beads from the bead-receiver in a bead collection zone by the application of reduced pressure,
the cyclone generator comprising an upper cylindrical portion and a lower frusto-conical portion, which tapers from the upper cylindrical portion, the cyclone suppressor being located below the lower frusto-conical portion of the cyclone generator, and the cyclone suppressor comprising a cylindrical portion having a greater cross-sectional area than the lowermost part of the frusto-conical portion of the cyclone generator,
the bead-receiver being rotatable so that beads are movable from the first fluid removal zone to the bead collection zone;
the cyclone suppressor comprises an outlet for the collection of beads, and further comprises a sampling aperture, not being the outlet for the collection of beads, and a sampling guide for directing beads to the sampling aperture, the sampling guide comprising a sampling conduit extending through a sampling aperture.

* * * * *